United States Patent
Colman (10) Patent No.: US 7,074,333 B2
(45) Date of Patent: Jul. 11, 2006

(54) RECOVERY OF LINEAR NUCLEIC ACIDS BY SALT DILUTION AND/OR REDUCED PRESSURE PRIOR TO CONTINUOUS PRESSURE DIFFERENTIAL ULTRAFILTRATION

(75) Inventor: Michael S. Colman, Beverly, MA (US)

(73) Assignee: Millipore Corporation, Billerica, MA (US)

(*) Notice: Subject to any disclaimer, the term of this patent is extended or adjusted under 35 U.S.C. 154(b) by 31 days.

(21) Appl. No.: 09/766,161

(22) Filed: Jan. 19, 2001

(65) Prior Publication Data

US 2002/0096474 A1    Jul. 25, 2002

(51) Int. Cl.
B01D 61/14    (2006.01)
C07H 21/00    (2006.01)

(52) U.S. Cl. .................. 210/650; 210/639; 210/644; 210/651; 210/767; 435/6; 435/91.2; 536/23.1; 536/25.4

(58) Field of Classification Search .............. 435/6, 435/91.2; 536/23.1, 25.4; 210/639, 644, 210/650–654, 767
See application file for complete search history.

(56) References Cited

U.S. PATENT DOCUMENTS

| 4,632,761 A | 12/1986 | Bowers et al. ............. 210/650 |
| 4,772,972 A | 9/1988 | Maeda ...................... 360/97 |
| 4,832,851 A | 5/1989 | Bowers et al. ............. 210/650 |
| 5,141,718 A | 8/1992 | Clark ........................ 422/99 |
| 5,223,133 A | 6/1993 | Clark et al. ................ 210/232 |
| 5,434,048 A | 7/1995 | Simon et al. ................ 435/6 |
| 5,543,305 A | 8/1996 | Cummins et al. ......... 435/91.1 |
| 5,589,342 A * | 12/1996 | Geiger et al. ................ 435/6 |
| 5,596,092 A | 1/1997 | Schneider ................ 536/25.4 |
| 5,707,812 A | 1/1998 | Horn et al. .................. 435/6 |
| 5,856,100 A | 1/1999 | Hayashizaki ................ 435/6 |
| 5,876,936 A | 3/1999 | Ju .............................. 435/6 |

FOREIGN PATENT DOCUMENTS

| EP | 0 442 026 | 8/1991 |
| WO | 00/66723 | 11/2000 |
| WO | 01/19482 | 3/2001 |
| WO | 01/79486 | 10/2001 |

OTHER PUBLICATIONS

Di James, "Sequencinb Principles and Methods", University of Cape Town, Mar. 2001.□□Printed from the internet on Dec. 1, 2005: << http://www.mcb.uct.ac.za/principles%20of%20DNA%20sequencing/sld001.htm >>.*

(Continued)

Primary Examiner—John Kim
Assistant Examiner—Krishnan S. Menon
(74) Attorney, Agent, or Firm—Nields & Lemack (57) ABSTRACT

A method of recovery of DNA fragments using ultrafiltration. The method of the present invention relates to the separation and/or fractionation of double stranded linear nucleic acids using continuous pressure differential ultrafiltration to achieve improved recovery of small PCR products. In one embodiment, dilution of sample such as small PCR products is carried out prior to purification by ultrafiltration. Subsequent filtration of linear DNA, for example, under diluted conditions significantly increases the recovery of smaller PCR products, and improves the recovery of larger DNA fragments as well. In another embodiment, reduced vacuum pressure is used during ultrafiltration to increase the recovery of smaller PCR products and improve the recovery of larger DNA fragments as well.

4 Claims, 8 Drawing Sheets

Recovery of a Small Linear Double-Stranded DNA as a Function of Cations

OTHER PUBLICATIONS

Anal. Chem. 1998, 70, 1516-1527; Ruiz-Martinez, et al.; "A Sample Purification Meth d for Rugged and high-performance DNA Sequencing by Capillary Electrophoresis Using Replaceable Polymer Solutions. A. Development of the Cleanup Protocol".

Anal. Chem. 1998, 70, 1628-1535; Salas-Solano, et al.; "A Sample Purification Method for Rugged and High-Performance DNA Sequencing by Capillary Electrophoresis Using Replaceable Polymer Solutions. B. Quantitative Determination of the Role of Sample Matrix Components on Sequencing Analysis".

BioTechniques vol. 19, No. 2 (1995); pp. 176-177; Benchmarks; "Method for Sequencing Foreign Genes Expressed from the Polyhedrin Promoter of Recombinant Baculoviruses".

MEMBRANE, 25 (4), 206-210 (2000); Chaudry, et al.; "High Throughput Sample Preparation using Ultrafiltration in Multiwell Plate Format: Post-Sequencing Cleanup f Dye Terminator Sequencing Reactions for Capillary Electrophoresis".

Applied and Theoretical Electrophoresis (1996), 6, 11-14; Devaney et al.; "The evaluation of fast purification methods for preparing polymerase chain reaction (PCR) products for capillary electrophoresis analysis".

BioTechniques, vol. 26, No. 5 (1999); Fangan, et al.; Product Application Focus; "Automated System for Purification of Dye-Terminator Sequencing Products Eliminates Up-Stream Purification of Templates".

Journal of Chromatograph B, 683 (1996) 109-114; Belgrader, et al.; "Automated polymerase chain reaction product sample preparation for capillary electrophoresis analysis".

Rapid Communicati ns in Mass Spectrometry, vol. 10, 1475-1478 (1996); M uradian, et al.; "Analyzing Sequencing Reactions from Bacteriophage M13 Matrix-assisted Laser Description/Ionization Mass Spectrometry".

WPI abstract Acc. No. 1995-113432[15] of RU 2017496 C (Vajnberg) Aug. 15, 1994.

Copy of the Search Report dated Jul. 25, 2002.

MultiScreen-384-PCR Plates User Guide P36239 Nr.Apr. 2000 von 2000.

Reek, F.H. u.a.: Use of Multiscreen plates for the preparation of bacterial DNA suitable for PCR Biotechniques (1995) 19 (2) 282-5.

QIAquick Multiwell PCR Purification Handbook May 1999.

Copy of the foreign communication dated Oct. 2004 with English translation.

\* cited by examiner

RECOVERY OF LINEAR NUCLEIC ACIDS BY SALT DILUTION AND/OR REDUCED PRESSURE PRIOR TO CONTINUOUS PRESSURE DIFFERENTIAL ULTRAFILTRATION

BACKGROUND OF THE INVENTION

Ultrafiltration with small devices is becoming the staple in biological research such as nucleic acid and protein research as researchers look to use smaller and smaller quantities in that research and as automation becomes more accepted. Such devices are typically single filter devices such as shown in U.S. Pat. Nos. 4,632,761, 4,772,972 and 4,832,851 or multiple well plates as is known from U.S. Pat. Nos. 5,141,718 and 5,223,133.

The process of ultrafiltration in such devices is used to fractionate different sized molecules from each other. This may be used to remove impurities from the process or to separate a desired component from any other component in the sample, such as unreacted components.

Continuous pressure differential ultrafiltration is often used to purify amplified double-stranded DNA products from contaminating primers, dNTPs and salts, for example, prior to use in downstream applications, such as DNA sequencing and microarray preparation. This approach simplifies purification, requiring minimal reagent addition, and is highly compatible with conventional laboratory automation procedures.

A 96-well MultiScreen PCR device and a 384-well device commercially available from Millipore Corporation can be used for such ultrafiltration. Such a device uses high vacuum pressure (25 inches Hg) to drive filtration and achieve rapid separation of the PCR products from contaminating reaction components. As many as 384 PCR samples can be purified in about 25 minutes using a single vacuum filtration step. PCR reactions are loaded onto the plate and vacuum is applied until the wells are completely empty. PCR products remain on the filter, while primers, dNTPs and salts pass into the filtrate. The purified PCR products are then resuspended from the membrane surface using an automated liquid handler, for example.

However, recovery of PCR products is graded, such that a lower percent recovery of small PCR products (e.g., less than 300 base pairs) is observed in comparison to larger products (e.g., greater than 300 base pairs), which exhibit increased recovery and with lower variability.

It is therefore an object of the present invention to provide a method for improving the recovery of DNA fragments, in particular, small DNA fragments, by continuous pressure differential ultrafiltration.

SUMMARY OF THE INVENTION

The problems of the prior art have been overcome by the present invention, which provides a method of recovery of DNA fragments using ultrafiltration. In particular, the method of the present invention relates to the separation and/or fractionation of double stranded linear nucleic acids using continuous pressure differential ultrafiltration to achieve improved recovery of small PCR products.

In one embodiment of the present invention, dilution of sample such as small PCR products is carried out prior to purification by ultrafiltration. Subsequent filtration of linear DNA, for example, under diluted conditions significantly increases the recovery of smaller PCR products, and improves the recovery of larger DNA fragments as well.

In another embodiment of the present invention, reduced vacuum pressure is used during ultrafiltration to increase the recovery of smaller PCR products and improve the recovery of larger DNA fragments as well.

DETAILED DESCRIPTION OF THE INVENTION

Although the present inventors are not to be held to a specific theory, consistent with their observations differential retention of different size single or double stranded linear nucleic acid fragments is a function of the fragment length, as linear double-stranded DNA molecules, for example, generally have the same radial distance across the double helix. The radius of gyration of a linear molecule in a field of flow (i.e., toward the membrane) proportionally increases with fragment length. Thus, smaller PCR products (defined herein as having 300 base pairs or less, depending in part upon the particular membrane being used) exhibit lesser radii of gyration than longer fragments and biophysically react very differently to subtle changes in gyration during ultrafiltration. In addition to flow rate of the solution, flexibility of linear nucleic acids will govern its gyration. Accordingly, increased flexibility would increase the radii of gyration of linear nucleic acid solutes and thereby increase the frictional coefficient between the solutes and the membrane pores. Dilution of the sample will serve to de-salt the phosphate backbone of the nucleic acid, increase its flexibility, and thereby decrease the filtration of small fragments and/or decrease the extent to which those fragments penetrate the membrane surface, resulting in increased recovery of smaller fragments by continuous pressure differential ultrafiltration.

Surprisingly, dilution increases flow rate but also increases recovery, especially of smaller fragments. Dilution is preferably carried out any liquid that reduces salt concentration and is not deleterious to the process or subsequent process such as further sequencing, including but not limited to water, EDTA, TRIS (trishydrochloride), TE (a mixture of trishydrochloride and sodium EDTA), polarizing solutes, viscosity increasing solutes, mixture of the foregoing, etc. Salt concentration also can be reduced by modifying the temperature of the sample. Temperature can effect recovery through both sample viscosity and DNA-salt interaction. Preferably, dilution is carried out using a suitable buffer, which is most preferably TRIS or TE. Flux-governing inert solutes, such as glycerol and surfactants, are not necessary for improved recovery, although they can be present in low concentrations (e.g., 0.1%).

The extent of the dilution can vary depending upon the identity of the PCR products, the extent of improved recovery desired, time of filtration considerations and the volumetric capacity of the device in which the dilution is carried out. Preferably a three to five-fold dilution of reaction products is carried out. The dilution can be accomplished by any suitable means, such as by mixing the reaction products with the diluting medium in a suitable vessel or directly in the filtration device, such as a MultiScreen-PCR plate. Total sample volumes are generally less than about 1000 microliters. The volume is dictated in part by the capacity of the device.

Alternatively, there may be certain instances were it is desirable to increase the salt concentration of a sample, such as when it is desirable to remove small contaminants which could interfere with subsequent processes such as DNA sequencing, cloning, microarray or single nucleotide polymorphism analysis. Salt concentration can be increased by any suitable means, such as by adding nucleic acid condensing agents, including but not limited to multivalent cations such as manganese, magnesium and hexaminecobalt chloride; polyamines such as spermine and spermadine; basic proteins such as histones; cationic surfactants such as cetyltrimethylammonium bromide; neutral crowding polymers such as polyethylenem glycol; and mixtures thereof, and by adding monovalent cations, such as sodium, potassium and ammonium. This process also can be used to separate linear nucleic acids from circular nucleic acids.

In another embodiment of the present invention, filtration is conducted under reduced vacuum pressure to increase recovery of smaller (less than 300 base pair) PCR products, as well as improving the recovery of larger PCR products. Reduced or low vacuum pressure is preferably less than about 25 in Hg, more preferably 10–20 in Hg, most preferably about 10 in Hg. Vacuum pressures less than about 10 in Hg are operable but can be difficult to control and will increase the time of filtration.

One advantage of monitoring the pressure used for filtration is the ability to utilize a wider range of membranes for the same separation. Thus, lower vacuum pressure (e.g., 10 to 12 in Hg) can be used for more porous membranes, and higher vacuum pressure (e.g., 20 in Hg) can be used for less porous membranes. In addition, incremental pressure can be used, such as higher vacuum pressure at the start of the filtration operation, and then reducing the vacuum pressure as the filtration proceeds, or vice versa.

Time of filtration varies depending upon the pressure used and the recovery desired. In general, longer times are needed as the vacuum pressure is reduced. For example, where 15 minutes was previously required for acceptable recovery at 25 in Hg., 25 minutes may be necessary at 10 in Hg for significant recovery improvement to be achieved. Those skilled in the art will be able to readily determine suitable filtration times without undue experimentation.

Alternatively, there may be certain instances were it is desirable to increase the salt concentration of a sample, such as when it is desirable to remove small contaminants which could interfere with subsequent processes such as DNA sequencing, cloning, microarray or single nucleotide polymorphism analysis. Flow rate can be increased by raising the pressure. This process also can be used to separate linear nucleic acids from circular nucleic acids.

One skilled in the art may combine the efficiencies of both processes to further enhance the recovery, especially of smaller nucleic acids. Thus, the pressure alteration can be used in combination with salt concentration alteration, if desired.

EXAMPLE 1

Recovery of Linear Double-Stranded DNA as a Function of Vacuum Pressure

Figure 1:
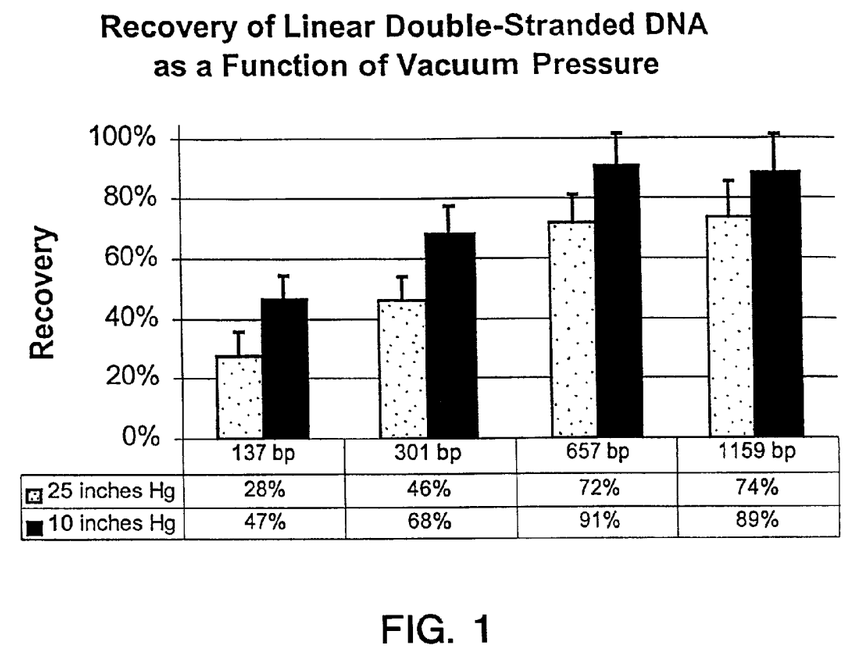
FIG. 1 is a graph illustrating the recovery of linear double-stranded DNA as a function of vacuum pressure.

Twenty microliter PCR reactions of increasing product sizes (n=96, each product at each operational condition) were purified using MultiScreen-384-PCR plates, and were filtered to dryness for either 15 or 25 minutes at 25 or 10 inches Hg, respectively. Purified samples were resuspended in 100 microliters of trisethylenediaminediacetic acid buffer and percent mass recovery was determined by concentration versus unpurified starting material using a fluorescence-based solution assay with SYBR Green I nucleic acid stain. The results are shown in FIG. 1. Increased recovery, especially of smaller linear double-stranded DNA, is demonstrated at the reduced vacuum pressure of 10 inches Hg.

EXAMPLE 2

Recovery of Linear Double-Stranded DNA as a Function of Inert Solute

Figure 2:
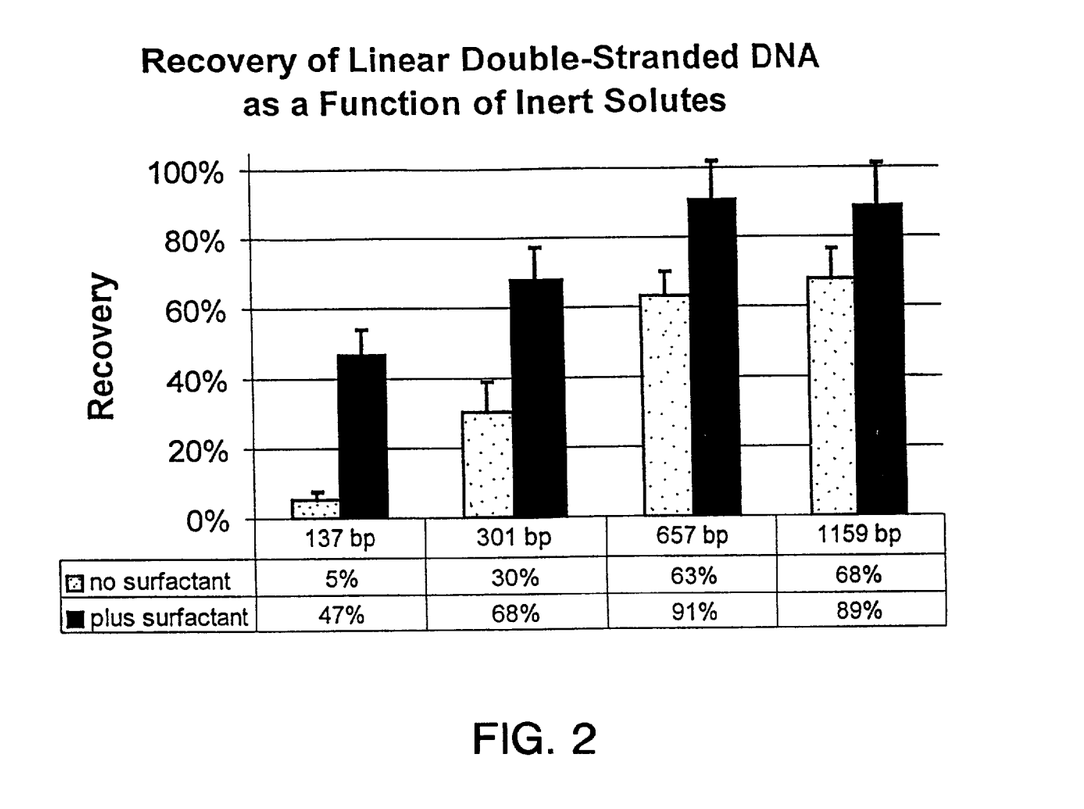
FIG. 2 is a graph illustrating the recovery of linear double-stranded DNA as a function of inert solutes.

Twenty microliter PCR reactions of increasing product sizes (n=96, each product in each buffer) were purified using MultiScreen-384-PCR plates, and were filtered for either 15 or 25 minutes at 10 inches Hg, without and with surfactant (Triton X-100 at 0.1% final concentration), respectively. Purified samples were resuspended and percent mass recovery was determined using the SYBR Green I recovery assay. The results are shown in FIG. 2. Increased recovery, especially of smaller linear double-stranded DNA, is demonstrated with surfactant.

EXAMPLE 3

Recovery of Linear Double-Stranded DNA as a Function of Buffer Composition

Figure 3:
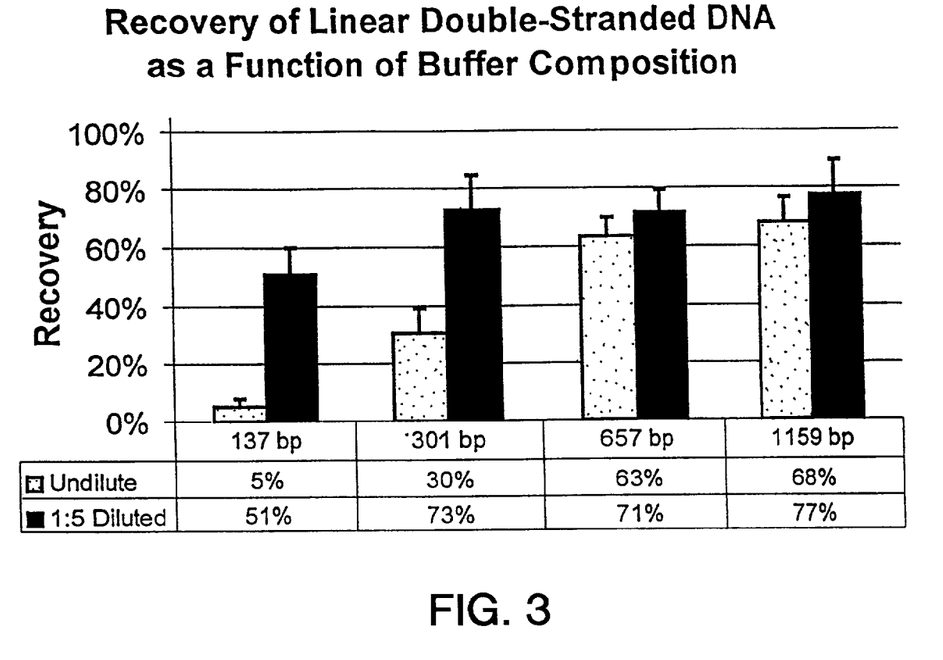
FIG. 3 is a graph illustrating the recovery of linear double-stranded DNA as a function of buffer composition.

Twenty microliter PCR reactions of increasing product sizes (n=96, each product undiluted) were purified using MultiScreen-384-PCR plates, and were filtered for 15 minutes, and 100 microliter 1:5 dilution PCR products (n=96, each product diluted with TE buffer) were filtered for 20 minutes, at 10 inches Hg. Purified samples were resuspended and percent mass recovery was determined using the SYBR Green I recovery assay. The results are shown in FIG. 3. Increased recovery, especially of smaller linear double-stranded DNA, is demonstrated with diluted sample.

EXAMPLE 4

Recovery of Small Linear Double-Stranded DNA as a Function of Cations

Figure 4:
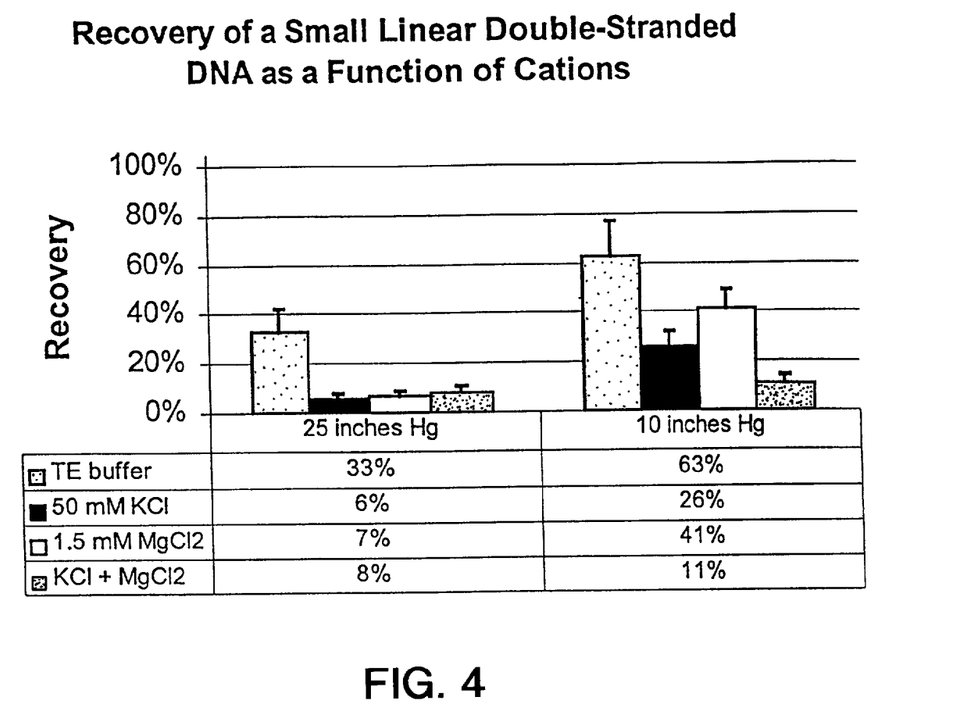
FIG. 4 is a graph illustrating the recovery of linear double-stranded DNA as a function of cations.

Using MultiScreen-PCR plates (96-well), 50 microliter PCR reactions of a 137 base pair product were diluted 1:3 using different diluents (as indicated in FIG. 4; n=24, each diluent at each pressure) and purified by filtration to dryness at either 25 or 10 inches Hg vacuum pressure. Samples were resuspended in 50 microliters of trisethylenediaminediacetic acid buffer and percent recovery was determined using SYBR Green I nucleic acid stain. As shown in FIG. 4, the effect of salt concentration on fractionation (as measured by recovery) is more pronounced at higher operational vacuum pressure. At the lower vacuum pressure, the differential effects of 50 mM potassium chloride and 1.5 mM magnesium chloride indicate that salt effects are a function of cationic species and concentration rather than being an anionic effect. A greater degree of fractionation is achievable with far less divalent cation (magnesium) than using a monovalent cation (potassium), whereas their combined effects are additive.

EXAMPLE 5

Recovery of Linear Double-Stranded DNA as a Function of Condensation

Figure 5:
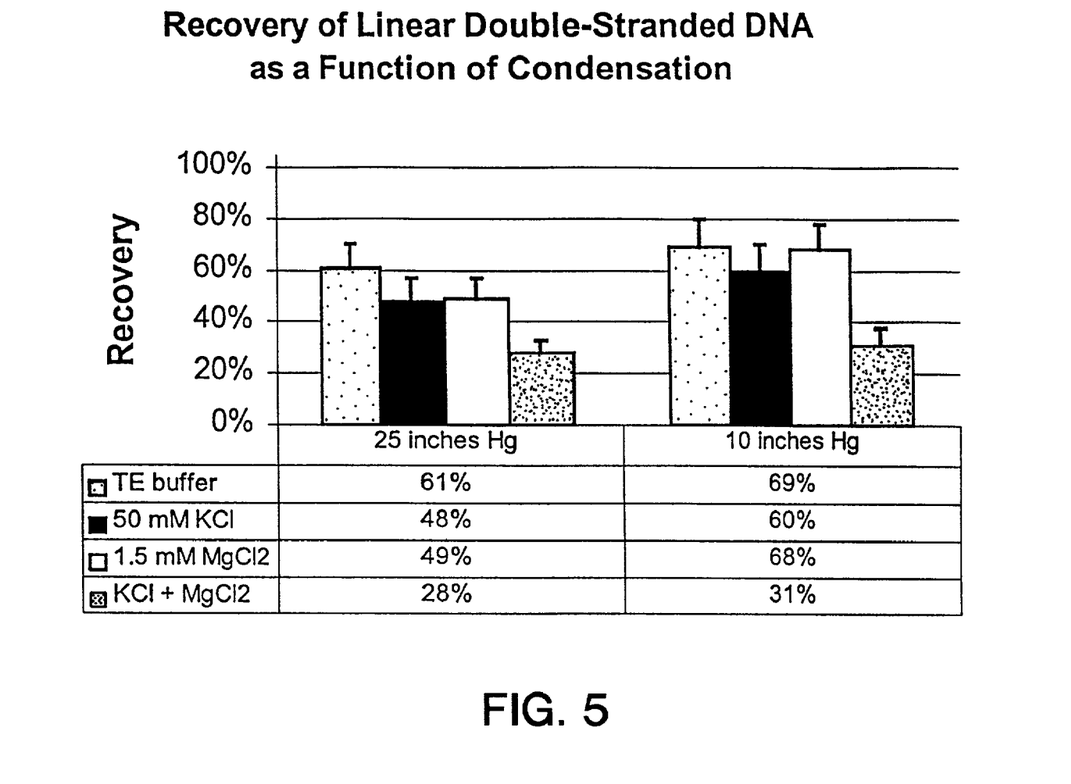
FIG. 5 is a graph illustrating the recovery of linear double-stranded DNA as a function of condensation.

Using MultiScreen-PCR plates (96-well), 50 microliter PCR reactions of a 301 base pair product were diluted 1:3 using different diluents (as indicated in FIG. 5; n=16, each diluent at each pressure) and purified by filtration to dryness at either 25 or 10 inches Hg vacuum pressure. Samples were resuspended in 50 microliters of trisethylenediaminediacetic acid buffer and percent recovery was determined by concentration versus unpurified starting material by gel electrophoresis, ethidium bromide staining and densitometric scanning. As shown in FIG. 5, additive effects of monovalent and divalent cations are observed at high vacuum pressure, whereas synergistic effects are observed at lower pressure. These data indicate that the effect of the divalent cation, magnesium, is likely a result of molecular condensation rather than simply salting out the phosphate backbone of the DNA, as the greater concentration of potassium would easily achieve in the presence or absence of the magnesium.

EXAMPLE 6

Recovery of Linear Double-Stranded DNA as a Function of Solute Mass

Figure 6:
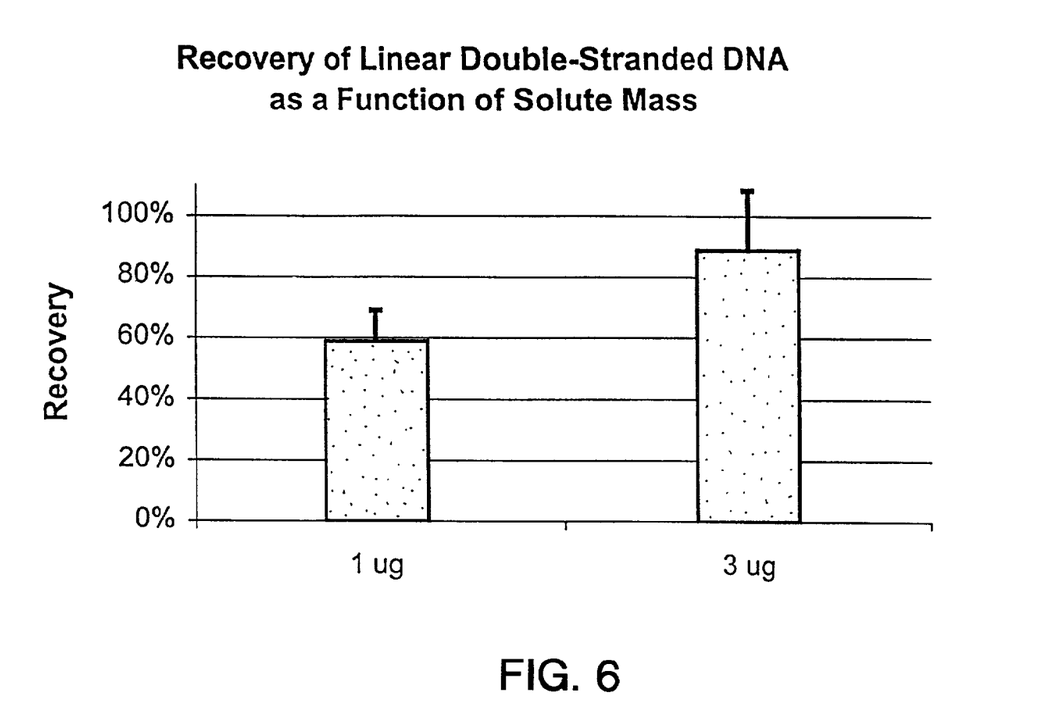
FIG. 6 is a graph illustrating the recovery of linear double-stranded DNA as a function of solute mass.

A 301 base pair product that had been amplified for extended rounds and yielded three-times higher product was purified using MultiScreen-PCR, and was compared to purification of the typical yield 301 base pair product. Fifty microliter undiluted PCR reactions (n=16, each) were purified by filtration to dryness at 25 inches Hg vacuum pressure. Samples were resuspended in 50 microliters TE buffer and percent recovery was determined by concentration versus unpurified starting material by gel densitometry. As shown in FIG. 6, adding solute mass increases percent recovery.

EXAMPLE 7

Recovery of Linear DNA is Independent of Strandedness

Figure 7:
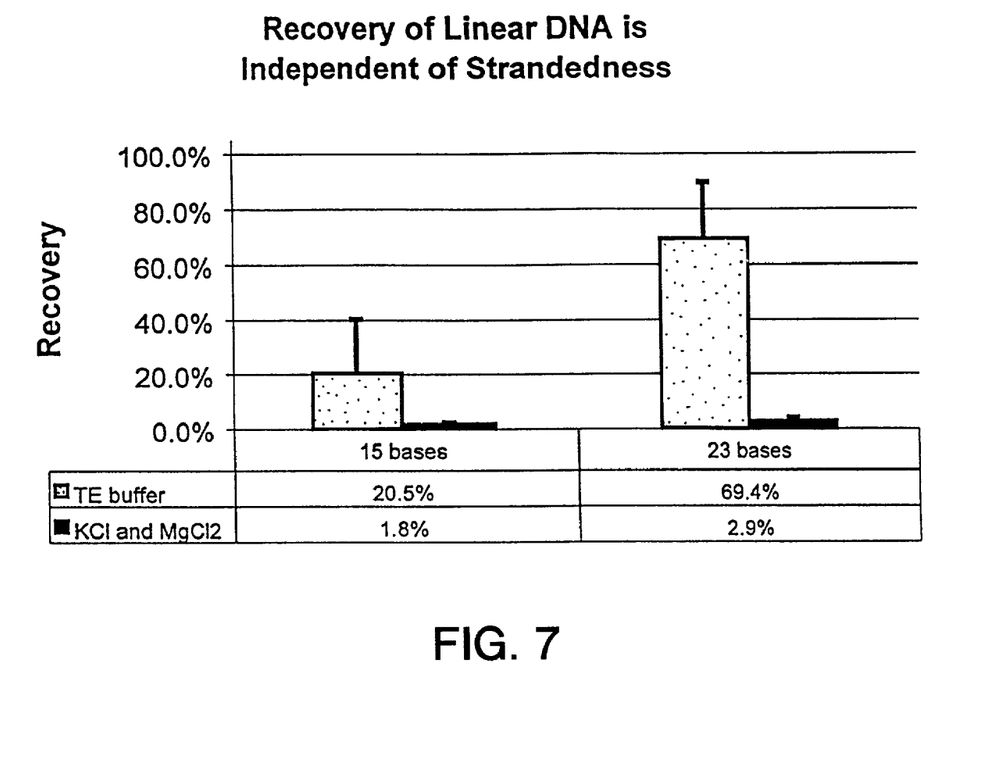
FIG. 7 is a graph illustrating the recovery of linear DNA is independent of strandedness.

Different length fluorescent-labeled oligonucleotides were filtered from 20 microliters to dryness using a Multi-Screen-384-SEQ plate, in TE buffer or in a 1:2 diluted mock mini-sequence reaction (template-free; 5 mM Tris-HCl, pH 8.3, 15 mM potassium chloride, 1.5 mM magnesium chloride, 25 µM each dNTPs). Samples were resuspended in 100 microliters of TE buffer and percent recovery versus each input oligonucleotide was determined by relative fluorescence (n=96, each) . The results are shown in FIG. 7. The behavior of nucleic acids in continuous pressure differential ultrafiltration is not limited to double-stranded fragments. Short, single-stranded oligonucleotides exhibit similar fractionation properties in the presence of salts.

EXAMPLE 8

Recovery of RNA As a Function of pH and Salt

Transfer RNA (70–80 bases) was diluted in increasing salt-containing solutions, either based in water or TE buffer, pH 8.0, prior to filtering 500 ng per well using two Multi-Screen-384 SEP plates.

Figure 8:
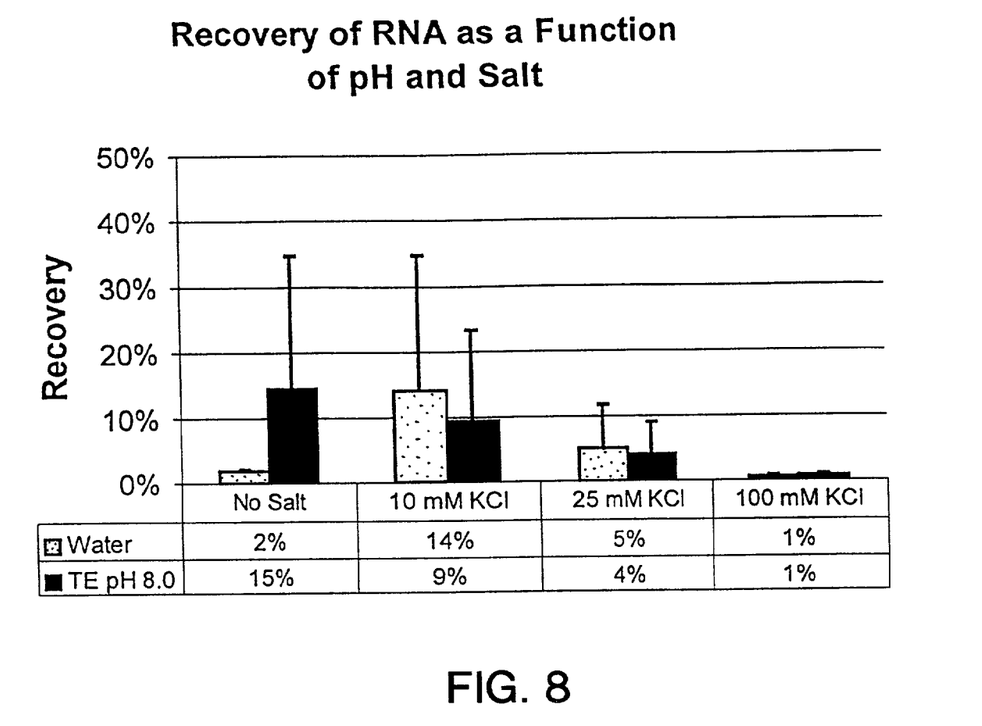
FIG. 8 is a graph illustrating the recovery of RNA as a function of pH and salt.

As shown in FIG. 8, buffer alone, versus water, enhances recovery of the tRNA to a similar extent as 10 mN salt in water. These data suggest that the effect of TE on tRNA recovery is likely to be a salt effect of introducing base pairing in the RNA secondary structure, but that greater concentrations of total salt have an inverse effect on recovery. However, these data do not exclude the possibility that the effect of TE is pH-based. Nonetheless, increasing salt concentration increases RNA fractionation potential and thereby decreases recovery after continuous pressure differential ultrafiltration.

What is claimed is:

1. A process for the improved recovery of double stranded linear nucleic acids of small fragment length having less than about 300 base pairs, from contaminants in a liquid sample, comprising increasing the concentration of said contaminants by adding to said sample a member selected from the group consisting of nucleic acid condensing agents and monovalent cations, and contacting the sample with an ultrafiltration membrane to fractionate said linear nucleic acid by fragment length, subjecting said sample to a pressure differential, and recovering said small fragment length double stranded linear nucleic acids.

2. The process of claim 1, wherein said nucleic acid condensing agents are selected from the group consisting of manganese, magnesium, hexaminecobalt chloride, spermine, spermadine, and mixtures thereof.

3. The process of claim 1, wherein said monovalent cations are selected from the group consisting of sodium, potassium and ammonium.

4. The process of claim 1, wherein said pressure differential is a constant pressure differential.

* * * * *